(12) United States Patent
Duflot et al.

(10) Patent No.: US 6,519,582 B1
(45) Date of Patent: Feb. 11, 2003

(54) PROCESS AND DEVICE FOR CONTROLLING AT LEAST TWO PRODUCTION UNITS

(75) Inventors: Nicolas Duflot, Chelles; Christophe Charrier, Asnieres sur Seine; Dominique Jouvaud, Paris; Patrice Ollivier, Ymeray, all of (FR)

(73) Assignee: L'Air Liquide Societe Anonyme a Directore et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/166,940

(22) Filed: Oct. 6, 1998

(30) Foreign Application Priority Data

Oct. 6, 1997 (FR) .......................... 97 12432

(51) Int. Cl.$^7$ ................................ G06N 7/02
(52) U.S. Cl. .................... 706/52; 701/106; 700/274
(58) Field of Search .................. 706/52; 700/274; 701/106; 60/732

(56) References Cited

U.S. PATENT DOCUMENTS

| | | | |
|---|---|---|---|
| 4,612,776 A | 9/1986 | Alsenz | |
| 5,247,806 A | 9/1993 | Ebisu et al. | |
| 5,307,276 A | * 4/1994 | Takahashi et al. | .......... 701/106 |
| 5,440,891 A | 8/1995 | Hindmon, Jr. et al. | |
| 5,798,946 A | * 8/1998 | Khesin | ........................ 700/274 |
| 5,819,540 A | * 10/1998 | Massarani | ..................... 60/732 |

OTHER PUBLICATIONS

Hooper, B.; Xiheng Hu; Jaros, G.; Baker, B., A fuzzy logic based decision support system for low–flow closed–loop anaesthesia, Fuzzy Systems, 1997., Proceedings of the Sixth IEEE International Conference on, vol. 3, 1997, pp.: 1615–1620 vol.3, Jan. 1997.*

Bica, B.; Akat, G.; Chipperfield, A.J.; Fleming, P.J., Multi-objective design of a fuzzy controller for a gas turbine aero–engine, Control '98. UKACC International Conference on (Conf. Publ. No. 455), 1998, pp. 901–906, vol. 2, Jan. 1998.*

Palm, R.; John, R. ; Supervisory fuzzy control of an exhaust measuring system, Fuzzy Systems, 1996., Proceedings of the Fifth IEEE International Conference on, vol.: 1, 1996, pp. 479–485 vol.1, Jan. 1996.*

Tatsuo, A., "Terminal Pressure Controller for Water Distribution," JP 09 062369 (Toshib Corp), Mar. 7, 1997, *Patent Abstracts of Japan*, vol. 097, No. 007, Jul. 31, 1997.

* cited by examiner

*Primary Examiner*—Mark R. Powell
*Assistant Examiner*—Wilbert L. Starks, Jr.
(74) *Attorney, Agent, or Firm*—Burns, Doane, Swecker & Mathis, L.L.P.

(57) ABSTRACT

The invention relates to a process for controlling at least two production units whose outputs are connected in parallel in order to produce a common output flow which is intended to feed a consumer plant. It controls the common output flow as a function of a predetermined target value (u) and includes the steps consisting in measuring at least one variable representing the common output flow; for each unit, determining a control instruction corresponding to one operating state of the unit among a finite set of predetermined operating states; and controlling the units with the control instructions determined. Two variables representing the common output flow are measured and the control instructions are determined by a fuzzy-logic controller.

Application to controlling a set of compressors.

14 Claims, 8 Drawing Sheets

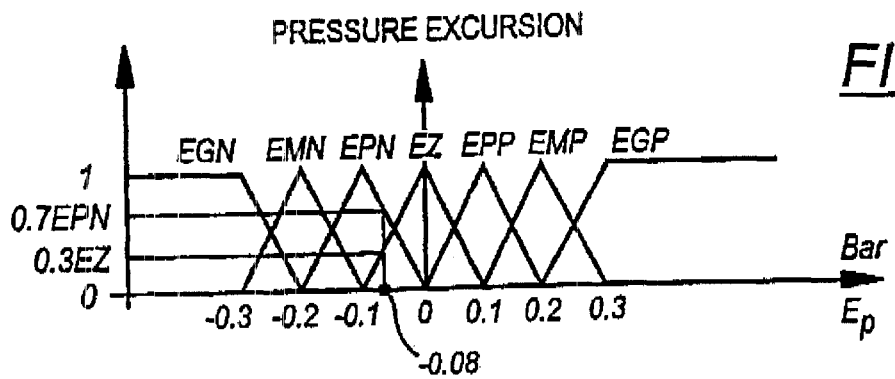
*FIG. 6*
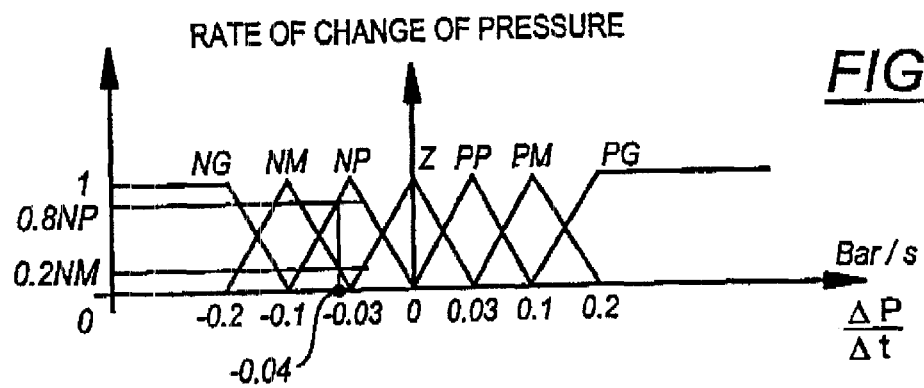
*FIG. 7*
RATE OF CHANGE OF PRESSURE
|  |  | NG | NM | Z | PP | PM | PG |
|---|---|---|---|---|---|---|---|---|
|  |  |  | 02 | 08 |  |  |  |  |
|  |  | NG | NM | NP | Z | PP | PM | PG |
| | EGN | A | A | A | A | A | R | R |
| | EMN | A | A | A | R | R | R | D |
| 0.7 | EPN | A | A 0.2 | R 0.7 | R | R | R | D |
| 0.3 | EZ | A | R 0.2 | R 0.3 | R | R | R | D |
| | EPP | A | R | R | R | R | D | D |
| | EMP | A | R | R | R | R | D | D |
| | EGP | A | R | R | D | D | D | D |
PRESSURE EXCURSION
*FIG. 8*

PROCESS AND DEVICE FOR CONTROLLING AT LEAST TWO PRODUCTION UNITS

RELATED APPLICATION

The present application claims priority under 35 U.S.C. §119 to French Application Serial No. 97 12432, the disclosure of which is hereby incorporated by reference.

BACKGROUND OF THE INVENTION (i) Field of the Invention

The invention relates to a process for controlling at least two production units whose outputs are connected in parallel in order to produce a common output flow which is intended to feed a consumer plant, the process controlling the common output flow as a function of a predetermined target value, the process including the steps consisting in:

measuring at least one variable representing the common output flow;

for each unit, determining a control instruction corresponding to one operating state of the unit among a finite set of predetermined operating states; and controlling the units with the control instructions determined.

The invention applies, in particular to controlling several gas producers operating in on/off mode, in particular air compressors, whose outputs are connected in parallel in order to supply a gas under pressure to a consumer plant, in particular a supply network of a factory.

(ii) Description of the Related Art

In applications of this type, the gas demands of the consumer plant vary in the course of time, so that the common output flow produced by the compressors needs to be controlled. In particular, it is desirable for the pressure at the common output of the compressors to be kept as close as possible to a predetermined target value.

In known plant, several compressors are mounted in parallel. For example, for an average consumption of 1000 $m^3$/hour, capable of rising to a peak of 1500 $m^3$/hour, three compressors having a nominal rate of 500 $m^3$/hour are installed in parallel. On average, only two compressors operate at the same time, the third compressor being inactive for most of the time.

In this type of plant, the compressors have three separate operating states. The first state corresponds to the compressor being stopped, the mechanical drive means being turned off. The second state corresponds to a disengaged or "idling" state of the compressor, in which the mechanical drive means are operating but the air compression means are disengaged. The third state corresponds to an engaged or "production" state of the compressor, in which the mechanical drive means are operating and the compressor is delivering compressed air at its output.

The current processes for controlling the output pressure of compressor sets of this type essentially consist in measuring the pressure at the common output of the compressors and in comparing it with a set of thresholds for activation or deactivation of each of the compressors.

In particular, when the plant includes three compressors, the process employs six thresholds, associated in pairs with a compressor. Each compressor is thus associated with an activation threshold and a deactivation threshold. Since the thresholds each correspond to one compressor, it is always the same compressor which is deactivated first. Similarly, it is always the same compressor which operates preferentially.

In order to solve this problem, it has been proposed to permute the thresholds between the various compressors in order to attempt to distribute the operating time between the various compressors. This permutation of the thresholds is carried out with a relatively long time period, of the order of a week.

Since the thresholds are each associated with one compressor, it can be seen that the system formed by three compressors is an oscillating system, with the output pressure varying between the upper and lower thresholds. The pressure also changes significantly at the output, and this leads to excessive energy consumption.

SUMMARY AND OBJECTS OF THE INVENTION

The object of the invention is to propose a control process which limits the ranges over which the output pressure of the compressors changes, and which thus makes it possible to reduce the total energy consumption.

To this end, the invention relates to a process for controlling at least two production units, characterized in that at least two variables representing the common output flow are measured and the control instructions are determined by a fuzzy-logic controller implementing the steps consisting in:

on the basis of measured variables, constructing input fuzzy variables;

for at least one unit, on the basis of the said input fuzzy variables and a knowledge base compiled beforehand and not depending on the intrinsic characteristics of the production units, determining a control instruction corresponding to one of the operating states among the finite set of predetermined operating states; and applying the determined control instruction to the or each unit.

According to alternative embodiments, the process includes one or more of the following characteristics:

one of the said measured variables is an estimate of the derivative, of a predetermined order, with respect to time of another of the said measured variables;

the production units are gas compressors and the measured variables are at least the pressure and the rate of change of pressure;

it furthermore includes the steps consisting in:

comparing at least one of the two measured variables representing the emerging flow with a set of predetermined thresholds;

determining a control instruction corresponding to one of the operating states among the finite set of predetermined operating states, for at least one unit, when the or one of the said variables subjected to the comparison crosses a predetermined threshold, irrespective of the control instructions determined by the fuzzy-logic controller; and applying the determined control instruction to at least one production unit.

when the or one of the said variables subjected to the comparison crosses a predetermined threshold, a delay is initiated and the determined control instruction is only applied to one of the production units at the end of the delay period if the variable in question is still beyond the said predetermined threshold;

during the delay period, the rate of change of the variable which crossed the predetermined threshold is compared with a reference threshold, and the determined control instruction is applied before the end of the delay period if the said rate of change crosses the reference threshold;

for at least one operating state, the total operating time of each production unit is stored, and the production unit to which the determined control instruction, associated with the or each state, is applied is selected from the production units totalling the shortest total operating time in the operating state resulting from application of the control instruction;

for at least one operating state, the total operating time of each production unit is stored, and permutations of the operating states between the units are made when the difference between the total operating times of the units in the operating states in question exceeds a predetermined threshold;

the input fuzzy variables are established on the basis of curves defined throughout the universal set of the measured variables, these curves all being of similar shape and regularly distributed over the universal set;

the curves are of substantially triangular shape in their non-zero zone; and the said finite set of operating states of each unit includes an idling state and a stop state, and the idling time of a unit, before a stop, is commensurately shorter as the number of stops of the said unit which have already been made during a determined preceding time period is low.

The invention will be understood more clearly on reading the following description, which is given solely by way of example and with reference to the appended drawings;

BRIEF DESCRIPTION OF THE DRAWINGS

FIGS. 6 and 7 are curves for determining the fuzzy variables as a function of the universal set, namely respectively the pressure and the derivative of the pressure with respect to time;

FIG. 8 is a table summarizing the inference rules determining the possible operating states of a compressor a function of the decision logic;

DETAILED DESCRIPTION OF THE PREFERRED EMBODIMENTS

Figure 1:
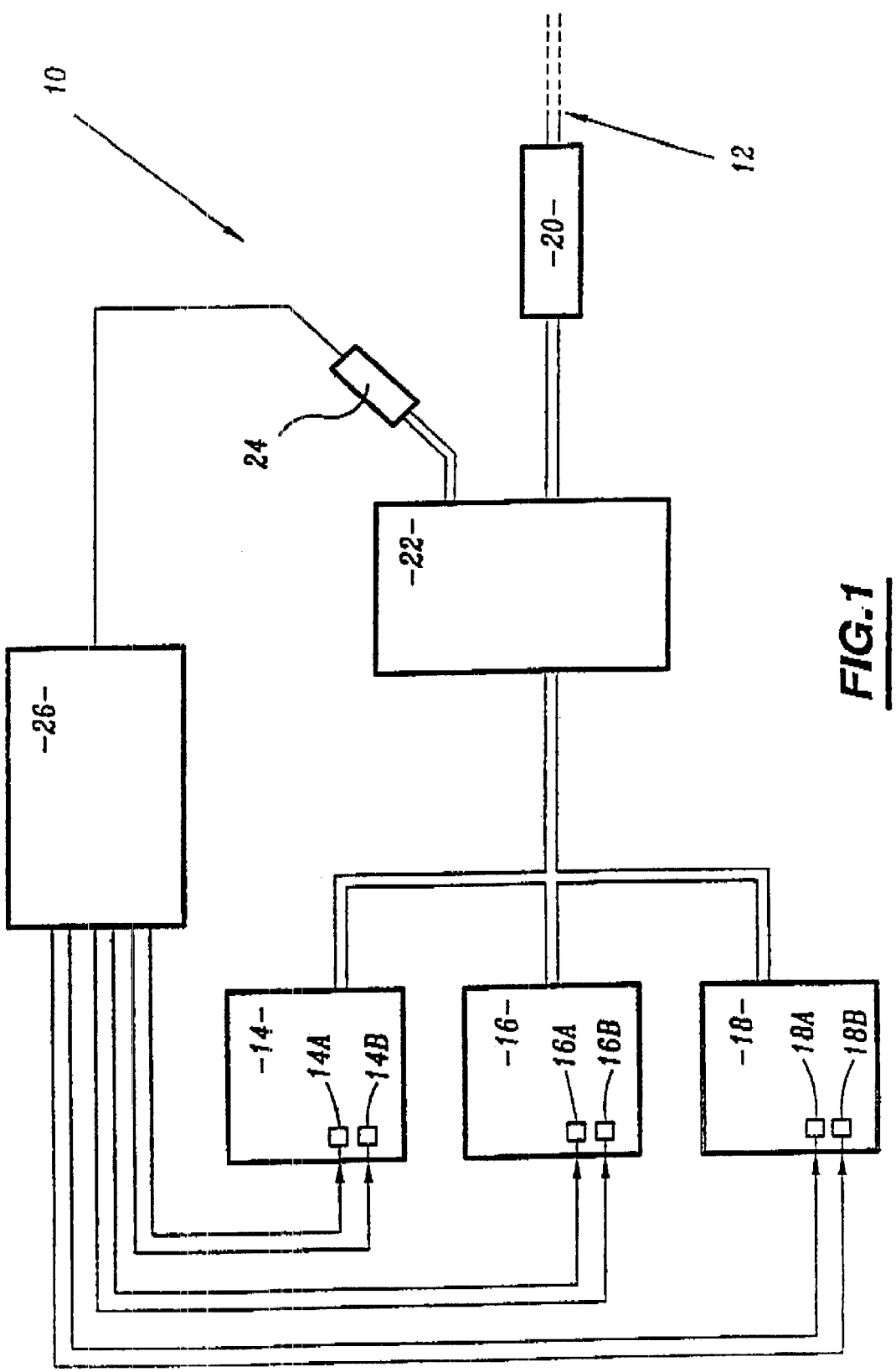
FIG. 1 is a schematic view of a plant for the production of compressed air.

FIG. 1 represents a plant 10 for the provision of compressed air to an output 12, to which a consumer plant (not shown) is connected, for example a distribution network of an industrial site.

The plant 10 includes three identical compressors 14, 16, 18 whose outputs are connected in parallel. The common output of the compressors is connected to a station 20 for drying and filtering the compressed air. A buffer tank 22 is interposed between the drying and filtering station 20 and the common output of the compressors. The output 12 is provided downstream of the drying station. As a variant, the order of the buffer tank 22 and the station 20 may be reversed.

A pressure sensor 24 is mounted on the buffer tap 22. This pressure sensor is connected to a controller 26, formed for example by a programmable automation unit. The latter is connected by a bundle of control wires fitted to each of the compressors 14, 16, 18.

In particular, each compressor includes a first relay, denoted 14A, 16A, 18A, for controlling the starting and stopping of the compressor. Furthermore, each compressor includes a second relay, denoted 14B, 16B, 18B, making it possible to activate or deactivate the compressed-air production when the compressor is running. This relay thus makes it possible to switch the compressor between its idling state and its production state.

Figure 2:
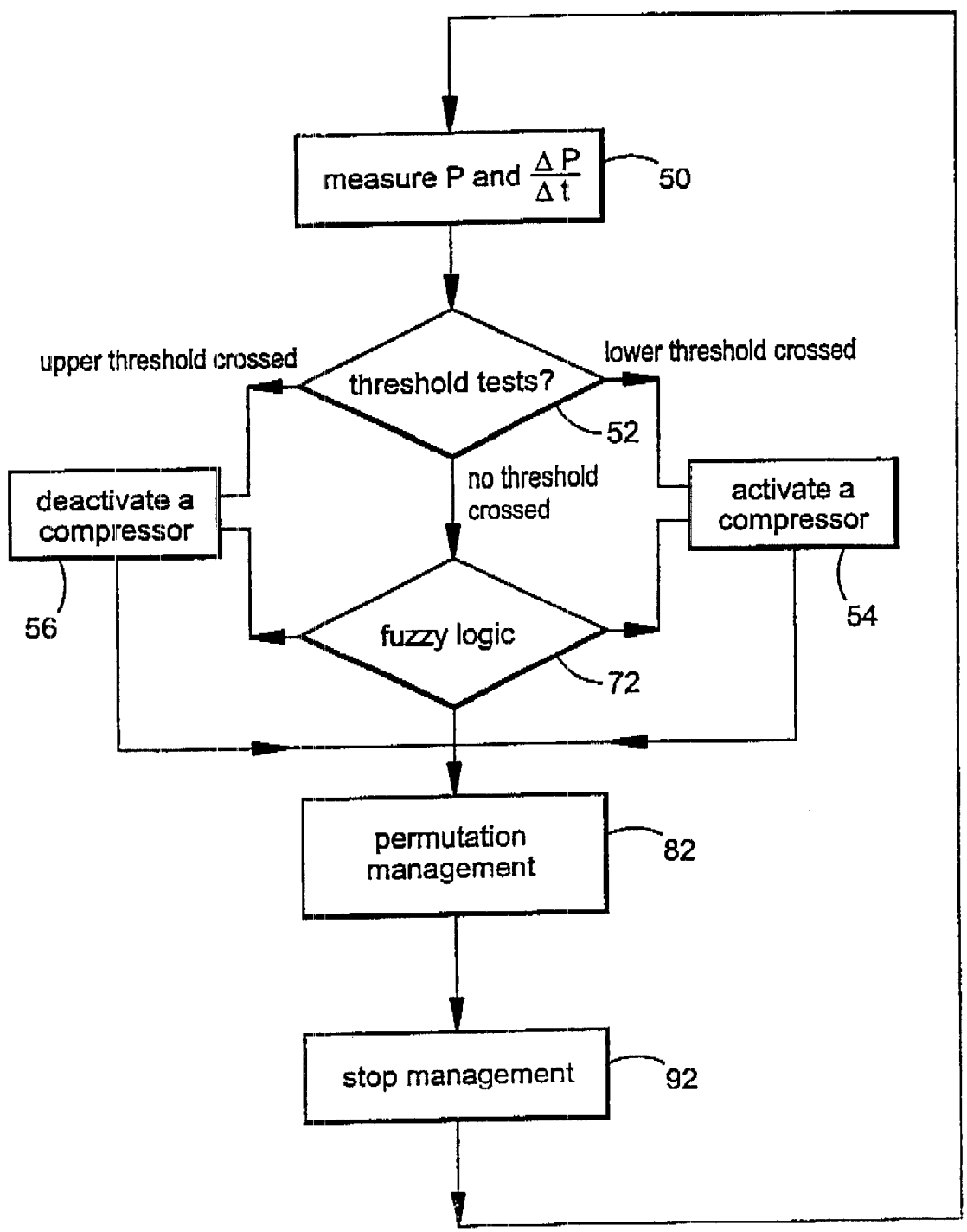
FIG. 2 is a flow chart showing the main steps in the operation of the controller.

FIG. 2 represents the main steps in the operation of the controller 26.

During a first step 50, the controller 26 measures, via the sensor 24, on the one hand the pressure P inside the buffer tank 22 and, on the other hand, the rate of change of pressure in this tank over the course of time, that is to say an estimate of the derivative of the pressure with respect to time, denoted $\Delta P/\Delta t$.

Figure 3:
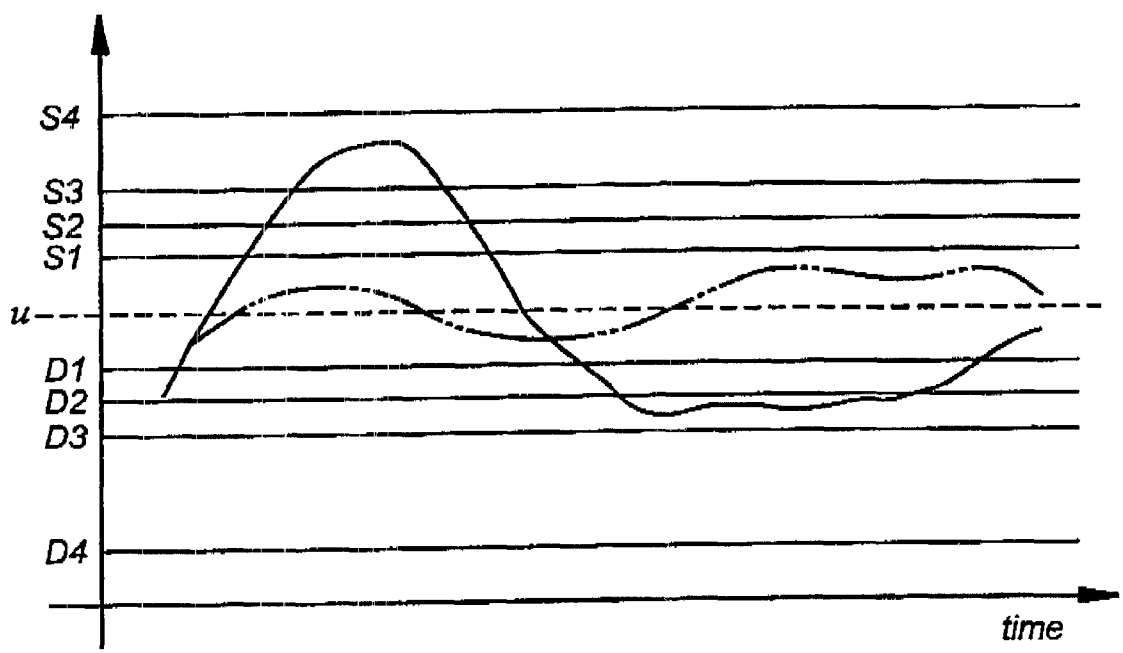
FIG. 3 is a curve showing two examples of the way in which the output pressure changes in the course of time.

A first test is made in step 52. It consists in comparing the pressure P with respect to a set of thresholds which are represented in FIG. 3.

In this figure, a solid line represents an example of a curve of the change in the pressure P as a function of time.

The target pressure, denoted u, is represented by a line of dashes.

This pressure u is framed by a set of four upper thresholds, denoted S1, S2, S3, S4 and a set of four lower thresholds denoted D1, D2, D3, D4. They correspond respectively to pressures at which it is necessary to activate or deactivate one of the compressors.

In the example in question, the activation of a compressor consists in switching it from its stopped state, or its idling state, to its production state. Conversely, deactivation consists in switching a compressor from its production state to its idling state.

Each threshold is associated with a user-defined delay. The delays become commensurately shorter as the threshold in question moves away from the target value u.

Thus, when the value of the pressure P crosses a threshold, the associated delay is initiated. When the delay elapses, if the value of the pressure is still beyond the threshold in question, corrective action is taken on one of the compressors. Depending on whether the threshold is above or below the target value u, one of the compressors is activated or, conversely, deactivated in order to change the output pressure.

It can thus be seen that if, for example, the pressure P rises very rapidly, the thresholds S2 or S3, which are given much shorter delays than the threshold S1, may be crossed and their delay may elapse, before the delay of threshold S1 has expired. Corrective action intended to deactivate one of the compressors is thus engaged before the delay of threshold S1 has elapsed.

Furthermore, the controller 26 simultaneously compares the rate of change of pressure $\Delta P/\Delta t$ with a certain number of predetermined reference values, in order to take corrective action as soon as a threshold is crossed, and even before the associated delay has been completed, if the value of the rate of change of pressure $\Delta P/\Delta t$ is greater in terms of absolute value than a predetermined reference value.

The thresholds as defined in the process are not assigned to one of the compressors. Instead, the crossing of a threshold only leads the controller to order activation or deactivation of one of the compressors. The compressor to which the control instruction is applied is determined by subroutines for managing the activation and deactivation of the compressors, these being respectively denoted 54 and 56 in FIG. 2.

Figure 4:
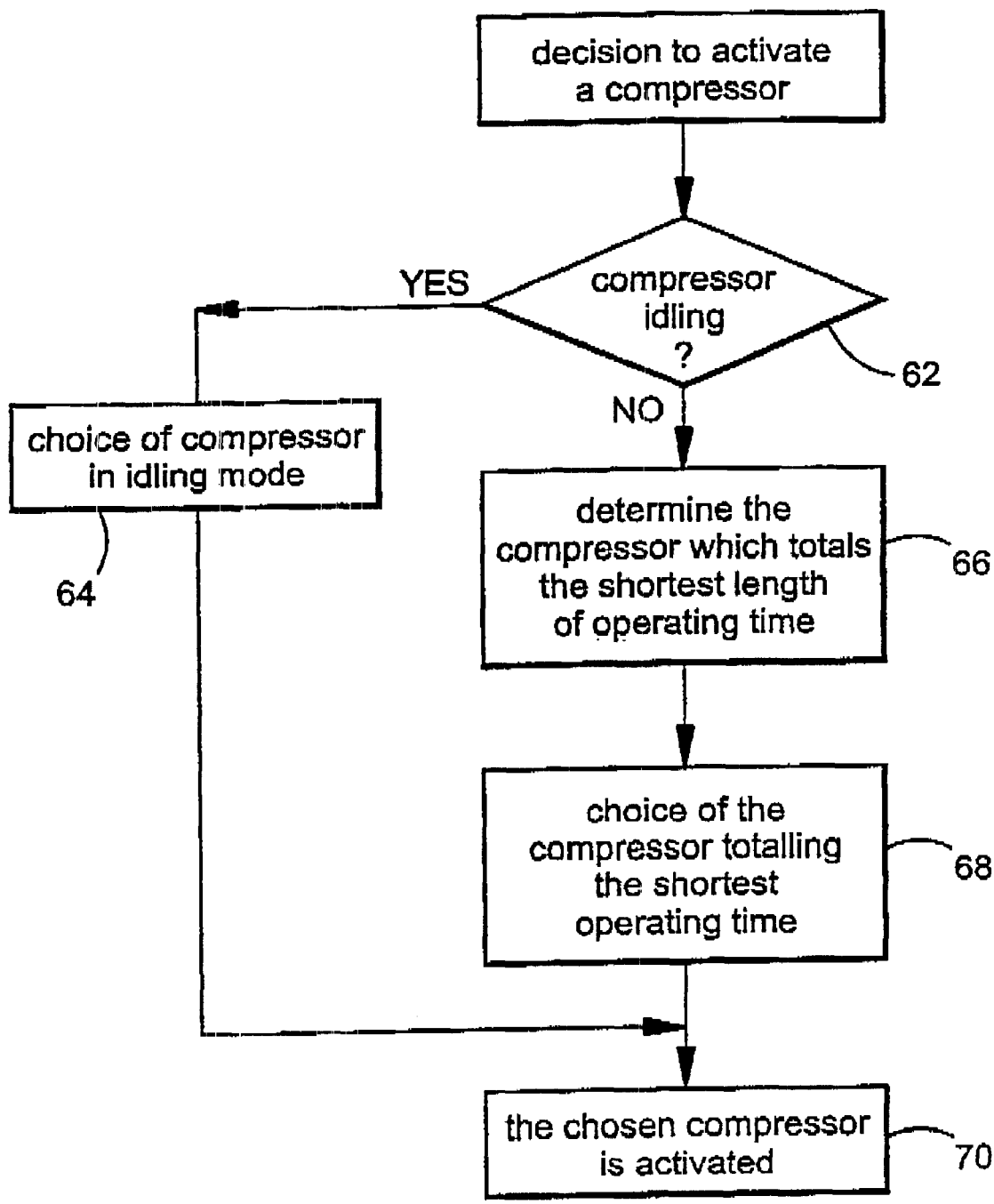
FIG. 4 is a flow chart detailing the algorithm for managing the permutations between the compressors.

The flow chart in FIG. 4 explains the process for activation of a compressor implemented in step 54.

When a decision is made to take corrective action with a view to activating a compressor, the software loaded into the controller checks, in step 62, whether one of the compressors is in an idling state, that is to say if it is running and if the compressed air production is deactivated. If this is the case, in step 64 it chooses this compressor with a view to its activation.

If none of the compressors is in an idling state, the controller determines, in step 66, the compressor whose total operating time in production is the shortest. To this end, the controller includes means for storing the cumulative operating times of each of the compressors since the plant was started.

The determination of the compressor having the shortest cumulative operating time is carried out by pairwise comparison of the operating times of each compressor. In step 68, the controller chooses the compressor having the shortest operating time with a view to ordering its activation.

Finally, in step 70, the controller 26 orders activation of the chosen compressor.

If the chosen compressor is in the idling state, it merely orders its activation. If no compressor is idling, it orders the chosen compressor to be turned on (the one having the shortest cumulative operating time) and simultaneously orders its activation.

Step 56 for deactivating a compressor is similar to the activation step described with reference to FIG. 4. However, the compressor preferentially deactivated is the one which totals the highest operating time.

If none of the thresholds is crossed, so that the pressure P varies between the thresholds S1 and D1, as represented by dots and dashes in FIG. 3, the controller moves onto step 72 and implements a fuzzy-logic decision mechanism.

Figure 5:
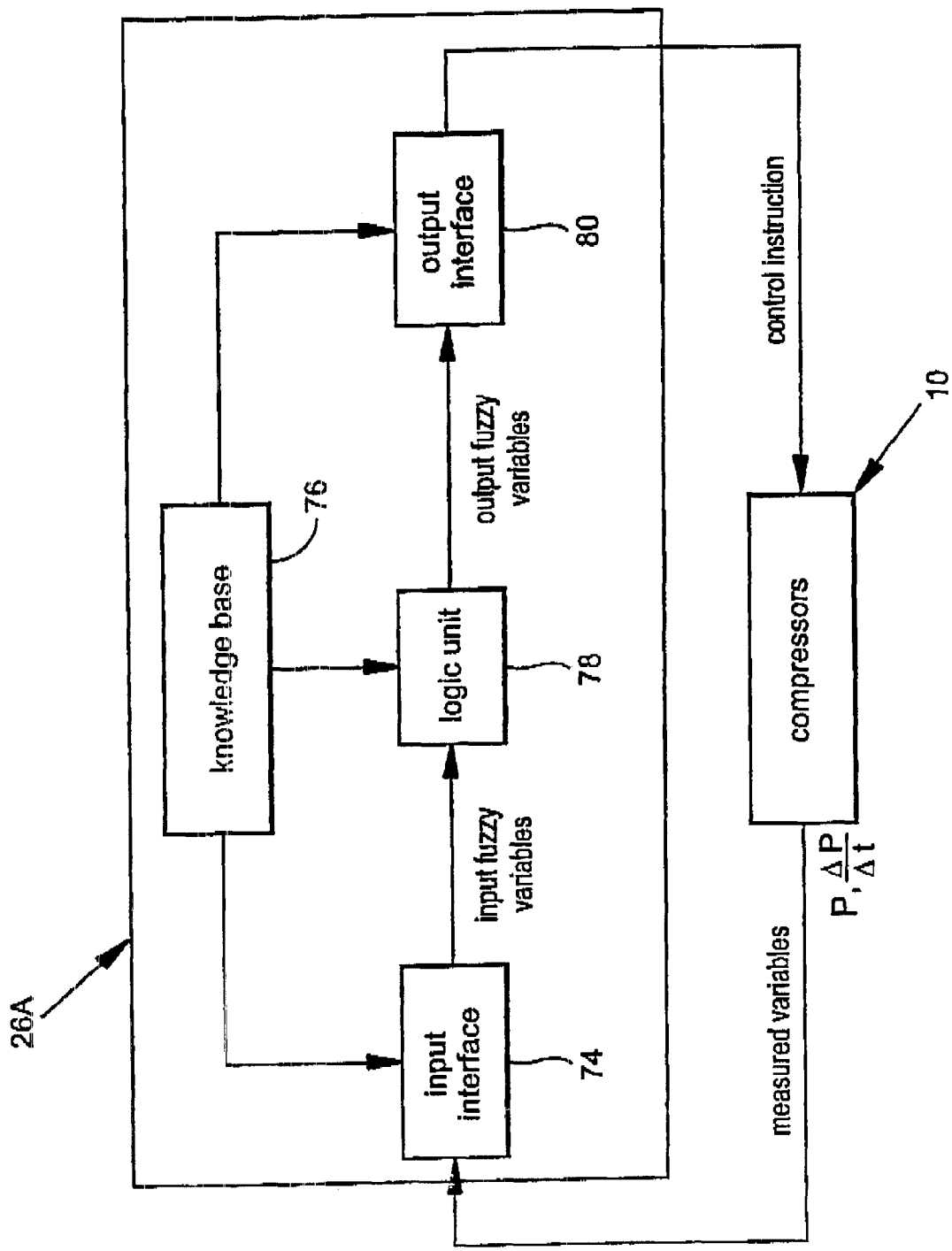
FIG. 5 is schematic view of the fuzzy-logic controller.

The diagram of the fuzzy-logic controller is represented in FIG. 5.

This figure symbolizes, on the one hand, the set of compressors of the compressed-air production plant 10 and, on the other hand, the fuzzy-logic controller denoted 26A.

The variables representing the compressed-air flow produced, P and $\Delta P/\Delta t$ (these are measured by the sensor 24), are firstly entered in an input interface 74 designed to convert the measured variables into input fuzzy variables on the basis of data given by a knowledge base 76 stored in the controller. This conversion will be explained further on in the description.

Fuzzy variables determined in this way are then entered into a logic unit 78 designed for processing them. This processing will be explained in detail further on in the description.

On the basis of the input fuzzy variables and the data contained in the knowledge base 76, the logic unit 78 creates output fuzzy variables which are sent to an output interface 80. The latter is designed to send control instructions to the various compressors of the compressed air compression plant 10 as a function of the output fuzzy variables. The way in which the control instructions are determined from the output fuzzy variables will be explained further on in the description.

For implementation of the decision process by fuzzy logic, the process according to the invention considers, as universal set, on the one hand the pressure excursion Ep and, on the other hand, the rate of change of pressure $\Delta P/\Delta t$. The pressure excursion Ep corresponds to the difference between the pressure P measured by the sensor 24 and the target value u.

Each universal set is divided into seven separate states, as represented in FIGS. 6 and 7.

Each state is defined by a curve which, generally, has the shape of a symmetrical triangular signal centred on a value of the pressure excursion Ep or of the rate of change of pressure $\Delta P/\Delta t$ that is characteristic of the state. The slopes of the triangular signals are equal for all the states associated with the relative pressure. Furthermore, the apices of the curves are regularly and symmetrically offset along the abscissa axis.

These curves are defined empirically and do not depend on the intrinsic characteristics of the compressors.

The various states corresponding to the input fuzzy variables of the two universal sets are defined as follows:

| Relative pressure (FIG. 6) | | Pressure change (FIG. 7) | |
|---|---|---|---|
| EGN: | Large negative excursion | NG: | Large negative |
| EMN: | Medium negative excursion | NM: | Medium negative |
| EPN: | Small negative excursion | NP: | Small negative |
| EZ: | Zero excursion | Z: | Zero |
| EPP: | Small positive excursion | PP: | Small positive |
| EMP: | Medium positive excursion | PM: | Medium positive |
| EGP: | Large positive excursion | PG: | Large positive |

The various states correspond, for the pressure excursion Ep, to a qualitative assessment of the excursion from the target value u and the measured pressure P and, for the rate of change of pressure $\Delta P/\Delta t$, to a qualitative assessment of the variation in the pressure over time with respect to a zero reference corresponding to a pressure which is constant over time.

The process for making a decision by implementing fuzzy logic will now be described with reference to an example.

In the example in question, it is assumed that the pressure excursion Ep is equal to −0.08 bar and that the rate of change of pressure $\Delta P/\Delta t$ is −0.04 bar/second.

On the basis of FIGS. 6 and 7, and projecting the values of the relative pressure and the pressure change over the corresponding universal sets, the input interface 74 gives four fuzzy variables, referred to as input fuzzy variables, equal to 0.7 EPN and 0.3 EZ for the pressure excursion, and equal to 0.8 NP and 0.2 NM for the rate of change of pressure.

Using the "min-max" rule, it is possible for the logic unit 78 to establish intermediate fuzzy-variable values. These are expressed as follows:

Min (NM, EPN)=0.2

Min (NM, EZ)=0.2

Min (NP, EPN)=0.7

Min (NP, EZ)=0.3.

FIG. 8 represents all the possible states which can be determined by the fuzzy decision logic. Thus, the three possible states are denoted A for the "Activation" fuzzy variable, R for the "Nothing" fuzzy variable and D for the "Deactivation" fuzzy variable.

The table in FIG. 8 is defined empirically from experience of the type of plant in question, and does not depend on the intrinsic characteristics of the compressors.

As represented in FIG. 8, the values obtained by taking the minima of the input fuzzy variables are entered in the table collating the possible states, at the intersection of the rows corresponding to the fuzzy variables associated with the pressure excursion and the columns corresponding to the fuzzy variables associated with the rate of change of pressure.

Among the output fuzzy variables determined in this way, the maximum coefficient associated with each of them is considered. In the example in question, this gives:

Max (nothing)=0.7
Max (activation=0.2.

After determination of these output fuzzy variables, the output interface 80 establishes, in the output universal set, the control instruction to be given to one of the compressors.

Figure 9:
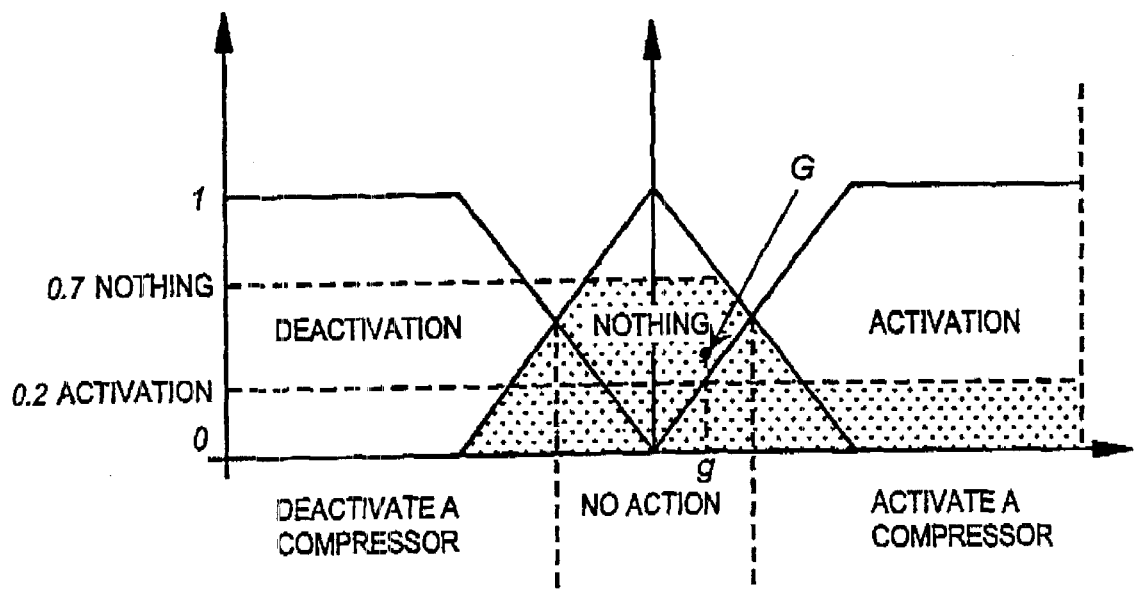
FIG. 9 is a graph showing the zones of influence of the fuzzy variables on the control instruction to be applied to a compressor.

To this end, FIG. 9 defines the zones of influence delimited by the bounding curves. They each correspond respectively to the deactivation of one of the compressors, to no action, or to the activation of a compressor. The universal set of the output variable corresponding to the control instruction is shown on the abscissa. The curves in FIG. 9 are determined empirically and do not depend on the intrinsic characteristics of the compressors.

With the two output fuzzy variables "0.7 nothing" and "0.2 activation" being plotted on the graph in FIG. 9, the privileged zones of influence are defined. These are represented in grey in FIG. 8.

In order to determine the control instruction to be applied to one of the compressors, the centroid G of the privileged zones of influence is determined and the projection g of this onto the abscissa axis is made.

In the example in question, the control instruction corresponds to taking no action, that is to say to keeping unchanged the number of compressors activated and the number of compressors deactivated.

If the fuzzy-logic decision algorithm employed in step 72 decides to activate or deactivate one of the compressors, steps 54 or 56, respectively, are implemented.

In order to avoid differential wear of the compressors, the algorithm which is implemented by the controller 26 and is schematically represented in FIG. 2 then includes, in step 82, a permutation routine for the compressors with the purpose of regularly distributing the operating times between all the compressors of the plant.

Figure 10:
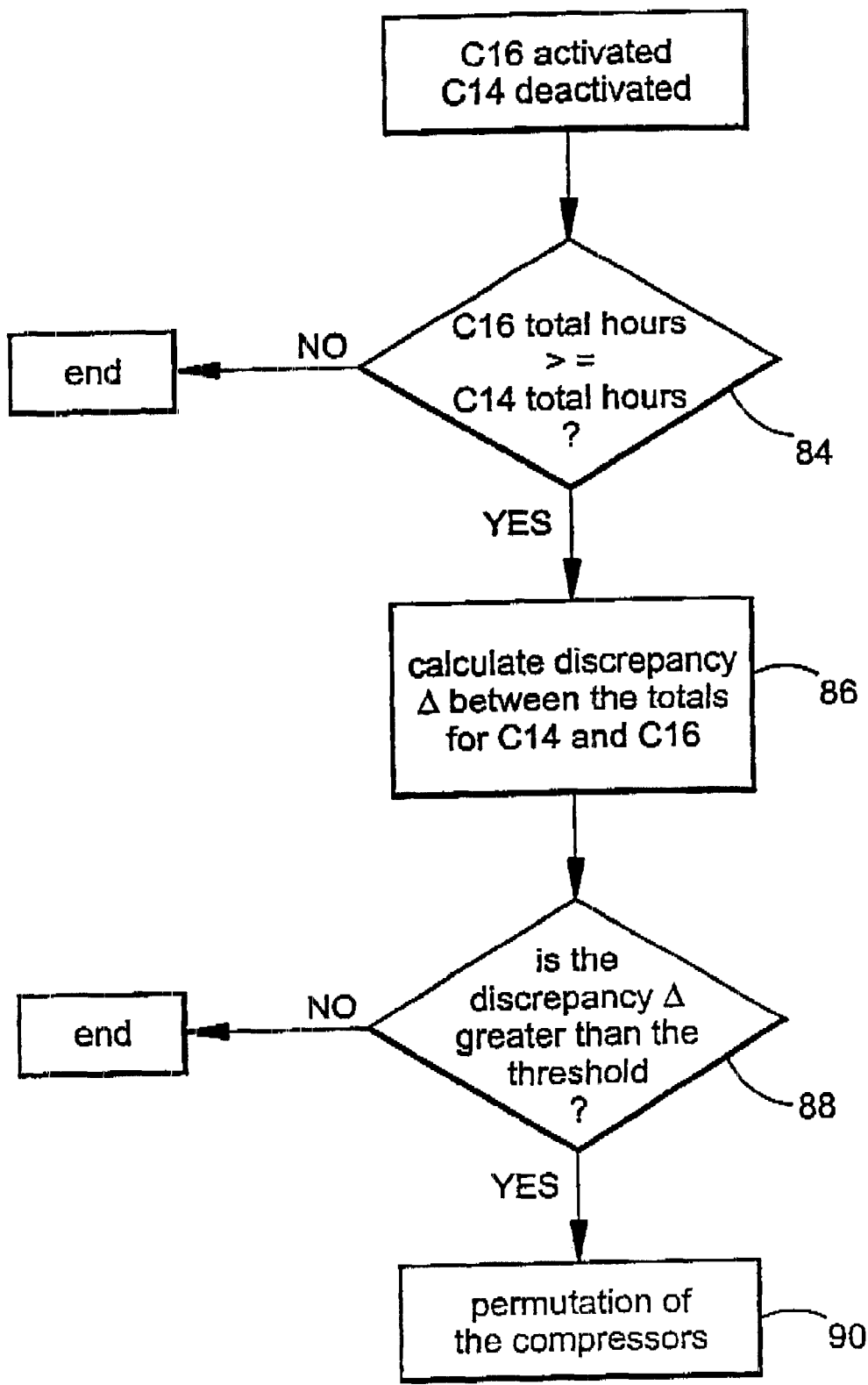
FIG. 10 is a flow chart detailing the algorithm for managing the stops of the compressors.

This routine is executed by the automation unit forming the controller 26, and essentially employs tests of the cumulative operating times of the compressors. It is schematically represented in FIG. 10 as regards determining the operational priority between the compressors 14 and 16. These routines compare the compressors in pairs. Thus, in the case of a plant having three compressors, the automation unit employs six routines of this type.

It is assumed that, initially, compressor 16 is activated while compressor 14 is deactivated.

In order to determine whether permutation between the two compressors is necessary, the routine checks, in step 84, whether the cumulative operating time of the compressor 16 is greater than or equal to the cumulative operating time of the compressor 14. If the response is negative, no action is taken. If the response is positive, the routine calculates, in step 86, the discrepancy Δ between the cumulative operating times of the compressors 16 and 14.

In step 88, the routine lastly compares this discrepancy Δ with a predetermined threshold. If the discrepancy Δ is less than this threshold, no action is undertaken. If, however, the discrepancy Δ is greater than this predetermined threshold, permutation of the two compressors is performed, in step 90. Thus, compressor 16, previously activated, is deactivated and compressor 14, initially deactivated, is activated.

Lastly, the process employed by the controller 26 includes a step 92 intended to manage the stops of the compressors in order to stop them at the end of a determined idling time.

In order to limit the number of stops and restarts of a compressor in a given period of time, for example one hour, the idling time at the end of which a compressor is stopped is determined on the basis of the number of stops already made in a given period of time.

In particular, the higher the number of stops made in the previous hour, the longer the idling time at the end of which a compressor is stopped.

Thus, if for example the compressor can be stopped six times per hour, and it has not already been stopped in the hour preceding the time in question, the compressor which is operating in idling mode will be stopped after a very short time, for example one minute. If, however, the compressor has already been stopped three times in the previous hour, the compressor operating in idling mode will be stopped after a longer delay, of five minutes.

The description given here relates to an air compressor plant. However, the process according to the invention may be employed for compressors of any type of gas, or alternatively any type of plant which includes production units that have a finite set of operating states and whose outputs are connected in parallel to produce a common output flow.

The process employed here, using a fuzzy-logic decision process, can be readily adapted from one plant to another, irrespective of the type of compressors used or plant used, since the data given by the knowledge base are independent of the type of compressor employed, and result only from knowledge established empirically on the basis of the type of plant in question.

Furthermore, the combined implementation of fuzzy-logic decision-making logic and the use of thresholds in the case when fuzzy-logic processing is insufficient makes the process highly reliable while being very accurate.

Lastly, the control process can be monitored remotely, in particular by a computer connected to the controller 26 via a data transmission link, for example the telephone network. Furthermore, the control parameters, in particular the target value, can then be modified remotely.

The control process employed makes it possible for the curve of energy consumption as a function of time to follow fairly accurately the profile of the curve describing the rate at which air is produced. It thus makes it possible to optimize the energy consumption while as closely as possible fulfilling the requirements of the plant downstream.

What is claimed is:

1. Process for controlling at least two production units whose outputs are connected in parallel in order to produce a common output flow which is intended to feed a consumer plant, the process controlling the common output flow as a function of a predetermined target value (u), the process comprising the steps of:

measuring at least one variable representing the common output flow;

for each unit, determining a control instruction corresponding to one operating state of the unit among a finite set of predetermined operating states by the steps comprising:

(a) comparing said at least one variable with at least one upper threshold and at least one lower threshold of said at least one variable;

(b) determining a control instruction of activating said production unit if said at least one variable is less than said at least one lower threshold to control said at least two production units;

(c) determining a control instruction of deactivating said production unit if said at least one variable is greater than said at least one upper threshold; and (d) if said at least one variable is not greater than said at least one upper threshold and is not lower than said at least one lower threshold, measuring a pressure (P) and a change in pressure over change in time ($\Delta P/\Delta t$) of said common output flow and determining the control instruction by a fuzzy-logic controller implementing the steps comprising (i) constructing input fuzzy variables on the basis of said pressure (P) and said change in pressure over change in time ($\Delta P/\Delta t$); and (ii) for at least one unit, on the basis of said input fuzzy variables and a knowledge base compiled beforehand and not depending on intrinsic characteristics of the production units, determining said control instruction corresponding to one of the operating states among the finite set of predetermined operating states; and applying the determined control instruction to control said at least two production units.

2. Process according to claim 1, wherein said at least one variable comprises an estimate of the derivative, of a predetermined order, with respect to time of another of said at least one variable.

3. Process according to claim 2, wherein the production units are gas compressors and the at least one variable of pressure (P) and rate of change of pressure ($\Delta P/\Delta t$).

4. Process according to claim 1 wherein said at least one variable is pressure (P) and said at least one upper threshold includes a set of four predetermined upper pressure (P) thresholds (S1, S2, S3, S4) and said at least one lower threshold includes a set of four predetermined lower pressure (P) thresholds (D1, D2, D3, D4).

5. Process according to claim 4, wherein;

said step of (b) determining a control instruction of activating said product unit further comprises the step of initiating a delay period;

said step of (c) determining a control instruction of deactivating said product unit further comprises the step of initiating a delay period; and wherein said step of applying the determined control instruction to control said at least two production units is applied only if, after said delay period, said at least one variable is greater than said at least one upper threshold or if said at least one variable is less than said at least one lower threshold.

6. Process according to claim 5, wherein, during the delay period, an absolute value of the rate of change of the at least one variable is compared with a reference threshold, and the determined control instruction is applied before the end of the delay period if the absolute value of said rate of change is greater than the reference threshold.

7. Process according to claim 1, further comprising the steps of storing total operating time of each production unit for at least one operating state and selecting a production unit, to which the determined control instruction associated with each stat is applied, from production units totaling the shortest total operating time in the operating state resulting from application of the control instruction.

8. Process according to claim 1, further comprising the steps of storing total operating time of each production unit for at least one operating state and making permutations of the operating states between the units when there is a difference between the total operating times of the units in the operating states exceeding a predetermined threshold.

9. Process according to claim 1, wherein said step (i) of constructing input fuzzy variables are established on the basis of curves defined throughout a universal set of the pressure (P) and change in pressure over change in time ($\Delta P/\Delta t$), wherein said curves are of similar shape and regularly distributed over the universal set.

10. Process according to claim 9, wherein the curves are of substantially triangular shape in their non-zero zone.

11. Process according to claim 1, wherein said finite set of predetermined operating states of each unit comprises an idling state and a stop state, and wherein a unit has an idling time, before a stop, which is commensurately shorter as the number of stops of said unit which have already been made during a determined preceding time period is low.

12. The process according to claim 1 wherein one of said production units is operating in an idling state and wherein said step of (b) determining a control instruction of activating said production unit if said at least one variable is less than said at least one lower threshold comprises determining a control instruction of activating the production unit in said idling state.

13. The process according to claim 1 wherein none of said production units is operating in an idling state and wherein said step of (b) determining a control instruction of activating said production unit if said at least one variable is less than said at least one lower threshold comprises determining the production unit that has operated for a least period of time and determining a control instruction of activating said production unit that has operated for said least period of time.

14. The process according to claim 1 wherein said step of (c) determining a control instruction of deactivating said production unit if said at least one variable is greater than said at least one upper threshold comprises determining a control instruction of deactivating the production unit that has operated for a greatest period of time and determining a control instruction of activating said production unit that has operated for said greatest period of time.

* * * * *